United States Patent
Henzler et al.

(10) Patent No.: US 7,337,521 B2
(45) Date of Patent: Mar. 4, 2008

(54) MACHINE TOOL, TRANSFER MACHINE TOOL, AND METHOD FOR THE MACHINING OF A WORKPIECE

(75) Inventors: Peter Henzler, Goeppingen (DE); Wolfgang Horn, Goeppingen (DE)

(73) Assignee: Ex-Cell-O GmbH, Eislingen/Fils (DE)

( * ) Notice: Subject to any disclaimer, the term of this patent is extended or adjusted under 35 U.S.C. 154(b) by 0 days.

(21) Appl. No.: 11/464,012

(22) Filed: Aug. 11, 2006

(65) Prior Publication Data

US 2007/0050968 A1 Mar. 8, 2007

Related U.S. Application Data

(63) Continuation of application No. PCT/EP2005/000891, filed on Jan. 29, 2005.

(30) Foreign Application Priority Data

Feb. 12, 2004 (DE) ...................... 10 2004 006 894

(51) Int. Cl.
*B23Q 11/08* (2006.01)
*B23P 23/00* (2006.01)

(52) U.S. Cl. ........................ 29/563; 409/134; 409/137; 408/67; 144/252.1

(58) Field of Classification Search ................. 29/563, 29/33 P, DIG. 50, DIG. 94; 409/134, 137, 409/130, 178, 179, 182; 408/67, 76, 241 G, 408/241 R; 144/252.1, 242.2; 141/93, 97, 141/65; 15/347, 268

See application file for complete search history.

(56) References Cited

U.S. PATENT DOCUMENTS 2,944,465 A * 7/1960 Jones .......................... 409/137
3,837,383 A * 9/1974 Ko ............................ 144/251.2
4,184,226 A * 1/1980 Loevenich .................. 15/415.1
4,296,523 A * 10/1981 Clark ........................ 15/415.1
4,813,462 A * 3/1989 Linn ............................ 141/93
4,822,219 A   4/1989 Wood et al.
5,380,446 A * 1/1995 Bratten ....................... 409/137
5,613,811 A * 3/1997 Tillemans ................... 409/130
5,630,682 A * 5/1997 Davey .......................... 408/67
5,667,565 A * 9/1997 Gondar ...................... 409/137
5,951,219 A * 9/1999 Stadtfeld et al. ............ 409/131
6,106,203 A * 8/2000 Asmis et al. ............... 409/137
6,299,393 B1 * 10/2001 Anders ....................... 409/131
6,755,597 B2 * 6/2004 Bergner et al. ............. 409/178
6,821,062 B2 * 11/2004 Hockauf et al. ............ 408/137

(Continued)

FOREIGN PATENT DOCUMENTS

DE    197 20 559 A1    11/1998

(Continued)

*Primary Examiner*—Dana Ross
(74) *Attorney, Agent, or Firm*—Alston & Bird LLP (57) ABSTRACT

In order to improve a machine tool with a working area, in which workpieces can be positioned and can be machined with at least one tool held by a tool holder, such that the disposal of shavings is optimized, at least one cover is provided which limits the working area in the direction of the tool holder, wherein the at least one cover is provided with at least one opening associated with the tool for the passage of the tool.

19 Claims, 4 Drawing Sheets

U.S. PATENT DOCUMENTS

| | | |
|---|---|---|
| 6,851,900 B2 * | 2/2005 | Tillemans et al. .......... 409/130 |
| 6,854,937 B1 * | 2/2005 | Weiss ......................... 409/137 |
| 6,887,146 B2 * | 5/2005 | Staas et al. ................... 454/66 |
| 7,036,412 B2 * | 5/2006 | Abdollahzadeh ......... 144/252.1 |
| 2002/0187014 A1 * | 12/2002 | Bergner et al. ............. 409/182 |
| 2003/0170082 A1 * | 9/2003 | Garcia et al. ................ 408/67 |
| 2005/0039321 A1 * | 2/2005 | Stave et al. .................. 29/563 |

FOREIGN PATENT DOCUMENTS

| | | |
|---|---|---|
| EP | 0 295 225 A1 | 12/1988 |
| WO | WO 00/76721 A1 | 12/2000 |

* cited by examiner

FIG.4

MACHINE TOOL, TRANSFER MACHINE TOOL, AND METHOD FOR THE MACHINING OF A WORKPIECE

CROSS REFERENCE TO RELATED APPLICATIONS

This application is a continuation of international application PCT/EP2005/000891, filed on Jan. 29, 2005, and also claims the benefit of German Application No. 10 2004 006 894.1, filed Feb. 12, 2004, both of which are incorporated herein by reference in their entirety and for all purposes.

BACKGROUND OF THE INVENTION

The invention relates to a machine tool with a working area, in which workpieces can be positioned and can be machined with at least one tool held by a tool holder. The invention relates, in addition, to a method for the machining of a workpiece.

During the machining of workpieces, machining waste occurs. In particular, shavings (chips) must be removed from the working area.

SUMMARY OF THE INVENTION

In accordance with embodiments of the present invention, the disposal of shavings is optimized. In accordance with the invention, at least one cover is provided that limits the working area in the direction of the tool holder, wherein the at least one cover is provided with at least one opening associated with the tool for the passage of the tool. As a result of limiting the working area by the cover, the volume of the working area is minimized. Thus, the amount of shavings which can pass into the working area is minimized since the distance between the workpiece to be machined and a limitation or boundary of the working area is minimized. It is possible to dispose of shavings via the opening for the passage of the tool, whereby provision is made, in addition, for a minimization of shavings which can pass into the working area and penetrate cavities of a machined workpiece.

As a result of the solution in accordance with the invention, a broad scattering of shavings is avoided in a constructionally simple manner. Particularly in conjunction with a transfer machine tool, a modular construction may be achieved since, with a plurality of working areas, one or several individual covers can be provided for each working area with a decentralized shavings discharge. A cover may be formed in a simple manner, for example, by a plate provided with one or several openings.

It is favorable when a discharge area for shavings is provided, via which shavings can be supplied, for example, to a shavings conveyor. The cover then limits the discharge area, in particular, towards the working area. The working area, in which the workpiece is machined, and the discharge area are connected via the openings. As a result, shavings can be removed by suction. The discharge area comprises, in particular, a section which is formed between the cover and the tool holder. This section is connected to the opening or openings in the cover so that shavings can pass into this section via the opening or openings and can then be removed by suction.

It is particularly advantageous when the discharge area is operatively connected to a device for acting with vacuum pressure. This device can, for example, be a turbine wheel. It is possible, as a result, to bring about low pressure in the discharge area which causes shavings to be sucked into the discharge area and, therefore, minimizes the amount of shavings which can pass into the working area.

It is favorable when the cover and a limitation or boundary (e.g., a wall) of the discharge area located outside the cover are arranged so as to overlap in order to form a seal. As a result, sealing can be achieved in a simple manner, particularly when the cover is movable. The cover preferably has, in the overlapping area, a section which is at an angle to a section which can abut on a workpiece. A good impermeability may be achieved due to overlapping, wherein movability of the cover is not interfered with on account of the inclined position.

It is particularly advantageous when the cover is movable. Prior to the machining of a workpiece, the cover may be advanced towards the workpiece to be machined and, in particular, can abut on it in order to make a working area with a minimized volume available. Prior to the machining and after the machining, the workpiece may be released due to a corresponding movement position of the cover in order to be able to transport this workpiece into the working area or to be able to transport it out of the working area. As a result of a movable cover, an optimized removal of shavings is effected during the machining, wherein the amount of shavings which can enter the working area is minimized. A transportability of the workpieces, for example, between various machining stations, is ensured outside the machining.

The cover is, in particular, displaceable in a direction transverse to a direction of transport of workpieces through the working area. When a workpiece is positioned in its machining position, the working area can be defined with a minimum volume as a result of corresponding displacement of the cover or covers. The movement of the at least one cover is, in particular, driven in order to bring about an advancement towards a workpiece via a lifting movement or to bring about a release of the workpiece.

It is particularly advantageous when the cover can abut on a workpiece to be machined. A type of jig may then be formed via the cover; if, for example, a drill machining is carried out, a type of drilling jig may be formed. The cover then seals a tool operating area on the workpiece in relation to the working area so that shavings cannot enter the working area itself, or the amount of shavings passing into the working area is reduced. Shavings can also be prevented to a great extent, via the cover, from entering cavities in a workpiece. As a result, the scattering of shavings is minimized.

The at least one opening in the cover is favorably sized sufficiently (e.g., large enough) to allow shavings to pass into the discharge area. The opening must be of such a size that a tool can act on a workpiece via the opening. If it is also ensured that shavings can be discharged via the opening, the amount of shavings passing into the working area can be minimized.

In one embodiment, the working area is limited by covers on oppositely located sides transverse to the direction of transport and is, in particular, limited by a pair of spaced covers. In this way, a workpiece may be machined from two sides at the same time, wherein the amount of shavings which passes into the working area is minimized. The covers are, in particular, movable synchronously in order to minimize the waiting times between machining procedures.

A transfer device is favorably provided for the transport of workpieces through the working area. As a result of the transfer device, a workpiece is delivered to a corresponding machining station for machining and after the machining the transfer device picks up the machined workpiece again in order to transport it further. The workpiece may also be positioned via the transfer device in its machining position in the working area.

The at least one cover and the transfer device are advantageously controlled in a synchronized manner. When the transfer device has, for example, positioned a workpiece in its machining position, a lifting movement of the covers towards the workpiece and, in particular, for abutting on the workpiece may be initiated immediately from the point of view of time. Following machining of the workpiece and lifting movement of the covers away from the workpiece, further transport of the workpiece may be initiated as soon as the covers (and, where applicable, tool holders) have been moved into a suitable position, in which the workpiece is released.

It is particularly advantageous when the at least one cover is arranged so as to be exchangeable. As a result, an adaptability of the machine tool is ensured, for example, when a different type of workpiece is intended to be machined or when different machining procedures are provided.

It is particularly advantageous when a plurality of working areas is provided. Different machining procedures may be carried out in different working areas. As a result, a transfer line may be realized and the workpiece machined in different machining stations while moving along this transfer line.

In accordance with an embodiment of the invention, a transfer machine tool is, in particular, realized that comprises at least one machine tool in accordance with the invention, wherein a plurality of working areas is provided. Different machining procedures may be carried out in the individual working areas. A modular construction may be brought about as a result of the solution in accordance with the invention.

A plurality of machining stations with respective working areas is, in particular, provided. The individual machining stations may be optimized separately from one another, wherein a separate shavings discharge can be provided, in particular, for each individual machining station. This, on the other hand, makes a modular construction possible since, for example, the individual machining stations can be disconnected with respect to the removal of shavings or with respect to the supply of coolant.

The working areas follow one another, in particular, in the direction of transport of the workpieces. The removal of shavings and/or discharge of coolant from the working areas is preferably brought about individually, i.e., decentralized. As a result, a modular construction with individual optimization in the machining stations may be achieved.

In accordance with another aspect of the invention, a method for the machining of a workpiece is provided, with which the disposal of machining waste, such as shavings, is optimized. In accordance with the invention, a movable cover is advanced towards a workpiece positioned for machining and a tool acts on the workpiece via an associated opening in the cover. Thus, the working area is minimized in its volume so that a reduced amount of shavings can reach the working area. As a result, the disposal of shavings may, again, be optimized. Shavings may, in particular, be discharged via the opening for the tool. The method in accordance with the invention has the advantages already explained in conjunction with the machine tool in accordance with the invention. Additional, advantageous embodiments of the method in accordance with the invention have likewise already been explained in conjunction with the machine tool in accordance with the invention.

It is particularly advantageous when the cover abuts on the workpiece. As a result, an operating zone of a tool on the workpiece may be sealed to a certain extent and so the occurrence of shavings in the working area can be minimized. An area behind the cover is, in particular, acted upon with low pressure in order to provide for a removal of shavings by suction.

The following description of a preferred embodiment serves to explain the invention in greater detail in conjunction with the drawings.

BRIEF DESCRIPTION OF THE DRAWINGS

In order to assist the understanding of certain embodiments of the invention, reference will now be made to the appended drawings, which are not necessarily drawn to scale, and wherein.

DETAILED DESCRIPTION OF THE INVENTION

The present invention now will be described more fully hereinafter. However, this invention may be embodied in many different forms and should not be construed as limited to the embodiments set forth herein; rather, these embodiments are provided so that this disclosure will satisfy applicable legal requirements. Like numbers refer to like elements throughout. As used in this specification and the claims, the singular forms "a," "an," and "the" include plural referents unless the context clearly dictates otherwise.

Figure 1:
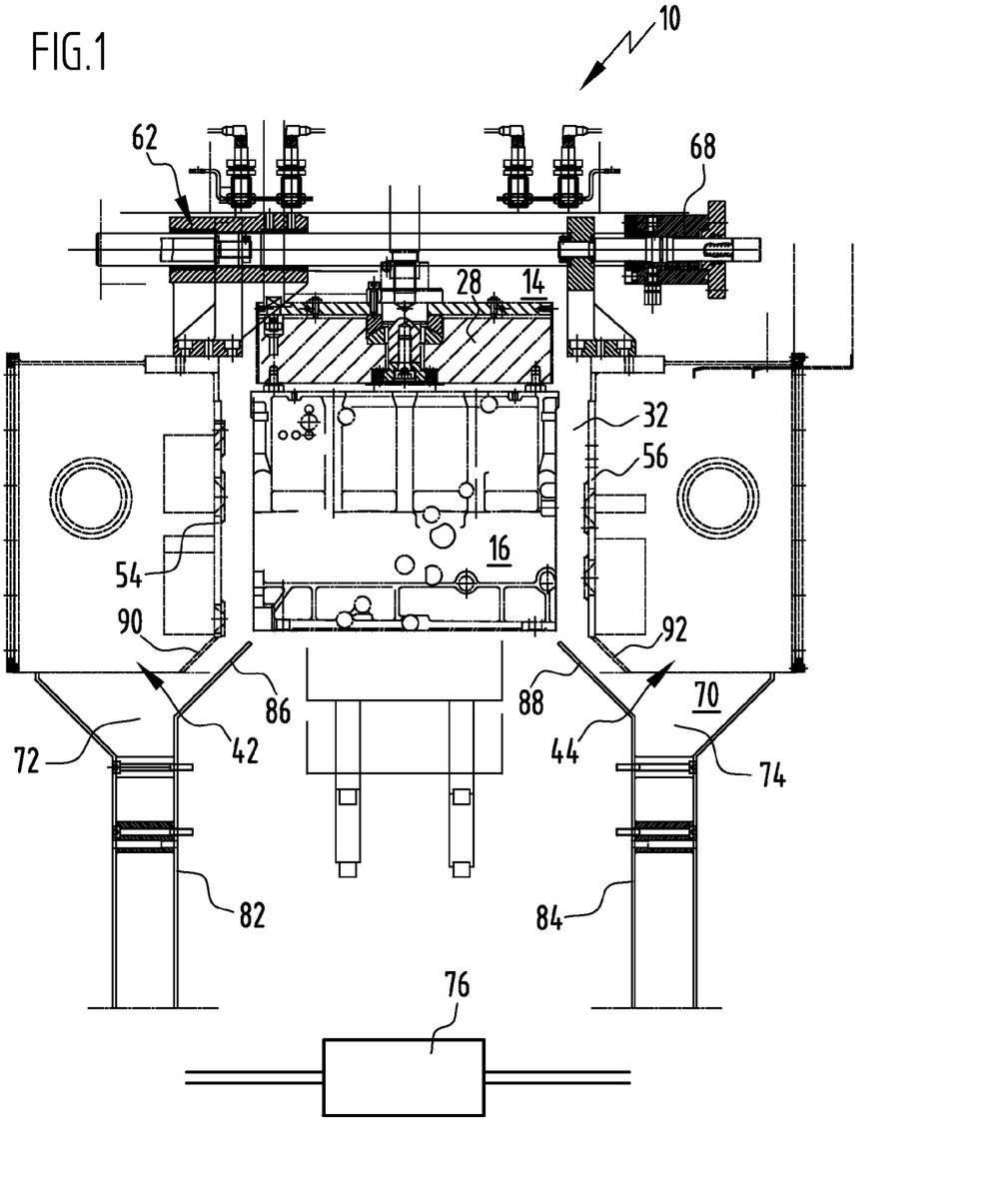
FIG. 1 shows a schematic sectional front view in the direction of transport of one embodiment of a machine tool according to the invention.
Figure 3:
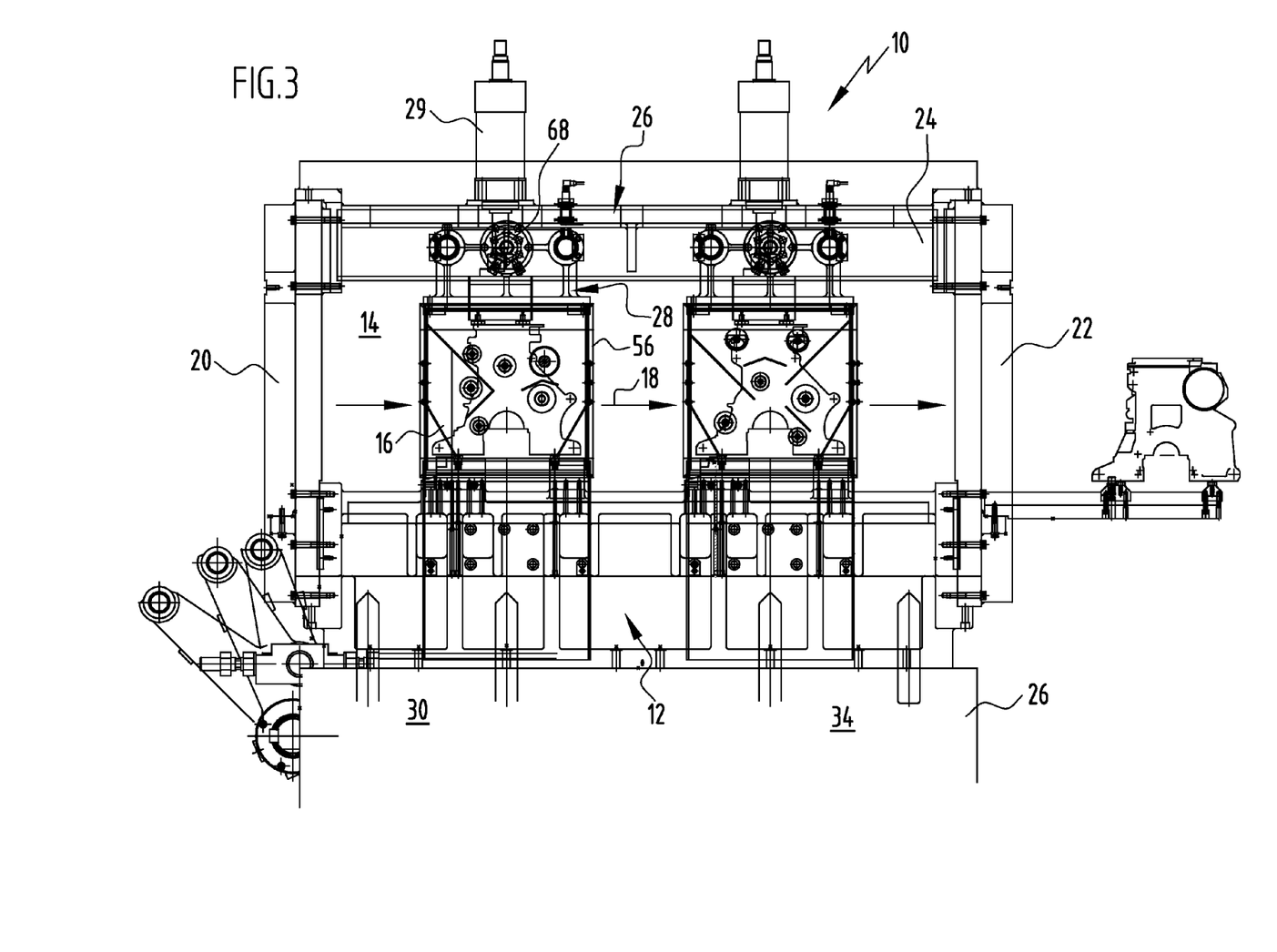
FIG. 3 shows a lateral sectional view of the machine tool according to FIG. 1.
Figure 4:
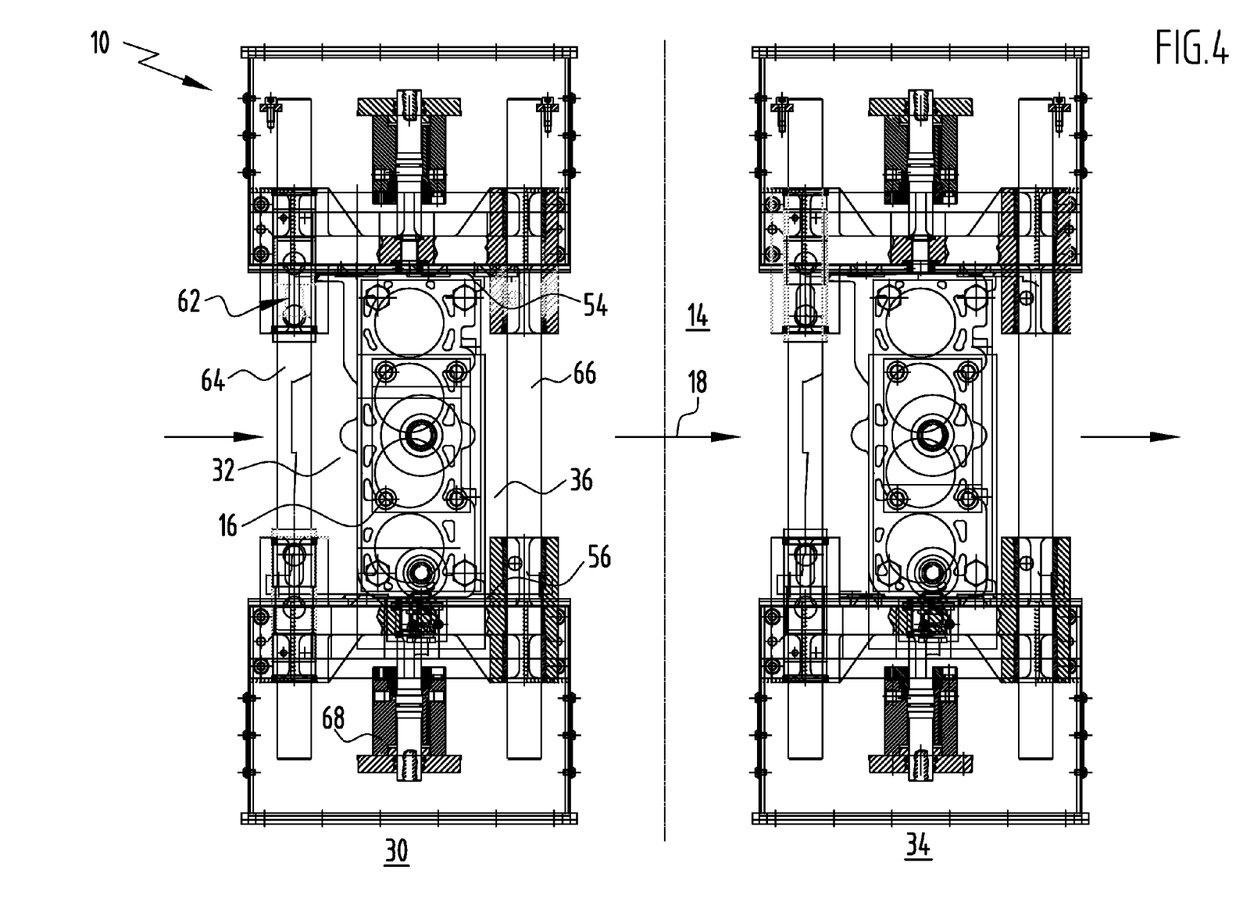
FIG. 4 shows a plan view of the machine tool according to FIG. 1.

One embodiment of a machine tool in accordance with the invention, which is designated in FIGS. 1, 3 and 4 as a whole as 10, comprises a clamping device 12 that is arranged so as to be stationary in order to clamp workpieces for their machining (FIG. 3). This clamping device 12 defines a lead through area 14 for the transport of workpieces 16 in a direction of transport 18 through the machine tool 10. In the embodiment shown, the clamping device 12 comprises two oppositely located portals 20, 22 which support one or several bearers 24 aligned in the direction of transport 18. Such a bearer 24 is, in relation to the direction of gravity, at a vertical distance from an underside of the clamping device 12, via which the clamping device 12 is placed onto a base 26.

The clamping device comprises a clamping element 28 which holds a workpiece 16 in the clamping device 12. The clamped workpiece 16 is then held locally (at the location of the clamping device 12) in the machine tool 10 via the clamping element 28. The clamping element 28 may be moved, for example, by means of a hydraulic cylinder 29 and thereby moved forwards and moved away, in particular.

The machine tool 10 comprises a first machining station 30 with a corresponding, first working area 32 and a second machining station 34 with a corresponding, second working area 36. Different machining procedures may be carried out at the machining stations 30, 34 for the workpiece 16 positioned in the respective working area 32, 36. The machining stations 30 and 34 with their working areas 32 and 36 are arranged so as to follow one another in the direction of transport 18 and are, in particular, stationary with respect to the clamping device 12. For their machining, the workpieces 16 are transported from the one machining station 30, after completion of the machining in this station, to the other machining station 34 for further machining.

The machine tool 10 is, as a result, a transfer machine tool, with which a transfer of a workpiece to be machined between different machining stations is brought about. It is, in principle, possible for additional, subsequent machining stations to also be provided.

Figure 2:
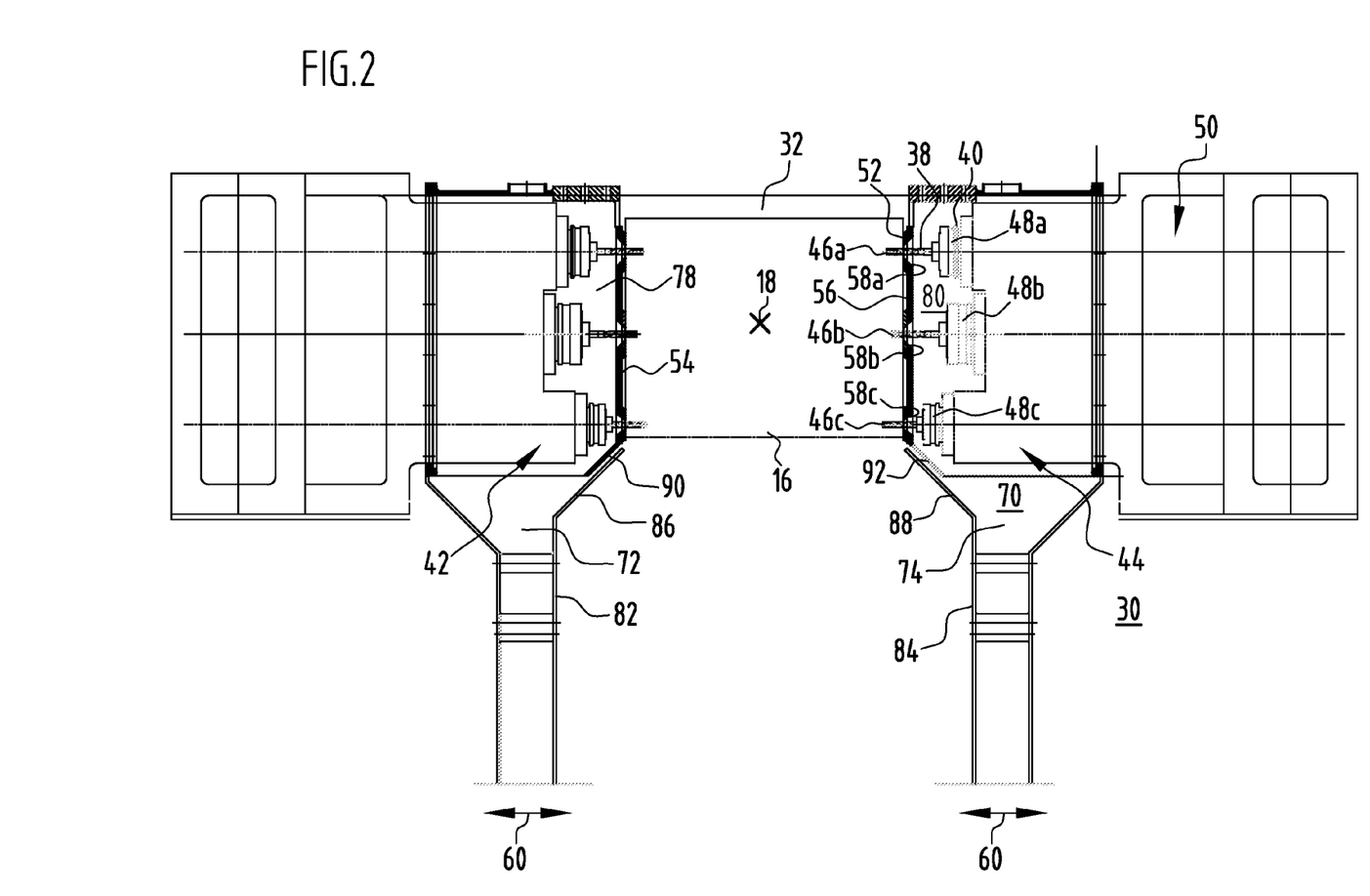
FIG. 2 shows a detailed view of FIG. 1.

Each machining station 30, 34 has at least one tool 38 for the machining of workpieces 16, such as, for example, a drilling tool or milling tool which is held on a tool holder 40 (FIG. 2). In the embodiment shown, the machining station 30 has a first tool device 42 and a second tool device 44. These two tool devices 42 and 44 are, in relation to the direction of transport 18, arranged so as to be located opposite one another and are, in particular, arranged so as to be symmetric to one another in relation to the direction of transport 18. As a result, machining of a workpiece 16 on both sides may be carried out when this is positioned in the corresponding working area 32 of this machining station 30. In the embodiment shown, each tool device 42 comprises three drilling tools 46a, 46b and 46c which are held by corresponding tool holders 48a, 48b and 48c. The tools are driven via a drive device 50.

In accordance with the invention, a cover 52, such as a plate-like cover, is provided which is associated with each tool device 42, 44. The first machining station 30 accordingly has a first cover 54 associated with the first tool device 42 and a second cover 56 associated with the second tool device 44. The covers 54, 56 have respective openings 58a, 58b and 58c which are associated with the tools 46a, 46b and 46c and through which the respective tools 46a, 46b and 46c can pass in order to be able to act on a workpiece 16. The covers 54, 56 delimit the working area 32 towards the tool holders 48a, 48b, 48c, i.e., define a lateral limitation of the working area 32.

In accordance with the invention, the covers 54, 56 are movable in a direction 60 transverse and, in particular, at right angles to the direction of transport 18. This direction of movement 60 is, in particular, essentially parallel to a longitudinal direction of the tools 38 and a direction of displacement of the tool holders 40 for advancing the tools 38 towards a workpiece 16 to be machined. The covers 54, 56 are, in particular, displaceable linearly in the direction 60. For this purpose, a corresponding guide device 62 is provided which comprises, for example, spaced guide supports 64, 66 (FIG. 4) which are held on the bearer or bearers 24 and extend transversely and, in particular, at right angles to the direction of transport 18. It is provided for the respective guide supports 64, 66 to form a guide for the cover 54 and for the cover 56.

The movement of the covers 54, 56 on the guide device 62 is driven, for example, via a hydraulic drive 68. Each cover 54, 56 is preferably provided with its own drive, wherein these drives are synchronized with one another so that, as described below in detail, the covers 54, 56 can be advanced towards a workpiece 16 in a synchronized manner or can be lifted away from the workpiece 16 in a synchronized manner.

In order to remove machining waste resulting during the machining of a workpiece 16 and, in particular, shavings, a discharge area designated as a whole as 70 is provided, wherein a first discharge area 72 is associated with the first tool device 42 and a second discharge area 74 with the second tool device 44. The discharge areas 72, 74 are operatively connected to a device 76 acting with vacuum pressure (FIG. 1), such as, for example, a turbine wheel. When acted upon by low pressure, shavings may be removed by suction via the discharge areas 72, 74 and supplied to a shavings conveyor.

Behind the covers 54, 56, a discharge area 78, 80 facing the respective tool holders 40 is formed (FIG. 2) and this is operatively connected to the discharge areas 72, 74 at least in a forward position of the covers 54, 56, in which they are advanced towards a workpiece 16, and, therefore, form the common discharge area 70. Shavings, which enter the discharge areas 78, 80, can then be removed by suction. The arrangement can also be such that the shavings fall into the shavings conveyor without being acted upon with low pressure as a result of the force of gravity.

A housing 82, 84, which is arranged in a stationary manner on the clamping device 12 and forms a limitation or boundary of the discharge areas 72 and 74, has a respective area 86, 88 which is at an angle in relation to the direction 60. The area 86 is at an acute angle of greater than 0° and smaller than 90° in relation to the direction 60 (in the embodiment shown, this angle is 45°).

The covers 54, 56 have an inclined area 90, 92 which is adapted accordingly and has essentially the same angular position with respect to the direction 60 as the corresponding associated area 86, 88 of the housing 82, 84. The associated areas 86, 90 and 88, 92 overlap at least in a position of the covers 54, 56 advanced towards the workpiece 16 (FIG. 2) and so sealing is achieved in relation to the working area 32. This sealing does not hinder the movability of the covers 54, 56.

The machine tool 10 in accordance with the invention functions as follows. A workpiece 16 is positioned in the first machining station 30 via a transfer device on the side of the machine which is not described here. During the positioning phase, the covers 54, 56 are displaced in the direction of the tool holders 40 so that the positioning is not hindered. Once the workpiece 16 is clamped locally with the clamping element 28 of the clamping device 12, a corresponding control device receives a release signal, whereupon the covers 54, 56 are moved away from the respective tool holders 40 and advanced in the direction of the workpiece 16. The covers 54, 56 preferably abut on the workpiece 16 on oppositely located sides.

Circumferential, bead-like elevations which point into the working area 32 may be formed at the openings 58a, 58b, 58c in order to obtain an improved sealing of a tool operating zone on the workpiece 16 in relation to the working area 32. The tools 38 then pass through the respective openings 58a, 58b, 58c in the direction of the workpiece 16 due to corresponding movement of the tool holders 48a, 48b, 48c and the corresponding machining procedures, such as drill machining procedures or milling procedures, are carried out.

The covers 54, 56 represent a type of jig, wherein the tools 46a, 46b, 46c act on the workpiece 16 via the openings 58a, 58b, 58c. The discharge areas 78, 80 are formed behind the covers 54, 56 facing the respective tool holders 40 and these areas are in communication with an operative area of the tools 46a, 46b, 46c on the workpiece 16 via the openings 58a, 58b, 58c. The discharge areas 78, 80, which are acted upon with low pressure via the discharge areas 72, 74, draw in a great proportion of the shavings resulting during the machining of the workpiece 16 by suction and these shavings are then removed via the discharge areas 70.

In the case of the solution according to the invention, the corresponding working area 32 is configured with minimized transverse dimensions (in a direction transverse to the direction of transport 18) during the machining of the workpiece 16. In addition, shavings are removed and, in particular, withdrawn by suction. As a result, the amount of shavings which can pass into the working area 32 and soil it is minimized, i.e., the penetration of shavings into the workpiece-tool side is minimized. The working area 32 has, accordingly, a minimized volume during the machining.

After termination of the machining procedure, the machined workpiece 16 is released in that the covers 54, 56 are moved away from the workpiece in the direction of the tool holders 40. The tool holders are, accordingly, also moved away and so the tools 46a, 46b, 46c no longer protrude into the working area 32. After the release of the workpieces, these can be transported by the transfer device to the next machining station 34, at which further machining is possible.

As a result of the solution according to the invention, a broad scattering of shavings generated during the machining is avoided and the resulting shavings are removed in a concerted manner. This is advantageous, in particular, in the case of a transfer machine tool, with which no change of tool takes place in the individual machining stations 30, 34 and with which the fundamental machining procedures per machining station 30, 34 are the same.

As a result of the movability of the covers 54, 56, a free transport for the workpieces 16 is, in addition, ensured when a workpiece 16 is intended to be supplied to a machining station 30 and 34, respectively, or a machined workpiece is intended to be removed from a corresponding machining station 30, 34. The covers 54, 56 may, in principle, be designed so as to be exchangeable in order to make an adaptation to different workpieces 16 or different machining procedures possible.

In accordance with the invention, a type of tunnel is made available for the machining. Machining is carried out only in the tunnel (the working areas 32, 36 with covers 54, 56 advanced towards the workpieces 16). As a result, a modular construction may be achieved, in particular, for a transfer machine tool. Provision can then be made for a discharge of shavings at each machining station separately and decentralized and so the individual machining stations can, in particular, be designed independently of one another with respect to the machining procedure.

The method in accordance with the invention, in which, for the machining of workpieces 16, the covers 54, 56 are advanced towards a workpiece 16 to be machined and tools 46a, 46b, 46c act on the workpiece 16 via openings 58a, 58b, 58c in the covers 54, 56, wherein a removal of shavings takes place via a discharge area 70 behind the covers 54, 56, may be advantageously used for dry machining, in which no lubricant is used or minimal lubrication is utilized. In principle, the method according to the invention may, however, also be used during wet machining. It is also possible to use the method according to the invention in machining centers.

Many modifications and other embodiments of the inventions set forth herein will come to mind to one skilled in the art to which these inventions pertain having the benefit of the teachings presented in the foregoing description. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A machine tool, comprising:
   a working area in which workpieces are positionable and are machinable with at least one tool held by a tool holder;
   a discharge area for shavings;
   a housing forming a boundary of said discharge area; and
   at least one cover, said cover limiting the working area in the direction of the tool holder;
   wherein said cover is movable and adapted for advancing towards a workpiece;
   wherein the at least one cover has at least one opening associated with the tool for the passage of the tool;
   said cover limiting the discharge area towards the working area; and
   said housing being arranged in a stationary manner so as to overlap with said cover in order to form a seal when the cover is advanced towards the workpiece.

2. The machine tool as defined in claim 1, wherein the discharge area comprises a section formed between the at least one cover and the tool holder.

3. The machine tool as defined in claim 1, wherein the discharge area is operatively connected to a device acting with vacuum pressure.

4. The machine tool as defined in claim 1, wherein, in the overlapping area, the at least one cover has a section which is oblique to a section adapted to abut on the workpiece.

5. The machine tool as defined in claim 1, wherein the at least one cover is displaceable in a direction transverse to a direction of transport of workpieces through the working area.

6. The machine tool as defined in claim 1, wherein the movement of the at least one cover is driven.

7. The machine tool as defined in claim 1, wherein the at least one cover is adapted to abut on a workpicce to be machined.

8. The machine tool as defined in claim 1, wherein the at least one opening in the at least one cover has a size sufficient to allow shavings to pass into the discharge area.

9. The machine tool as defined in claim 1, wherein the working area is limited by covers on oppositely located sides transverse to a direction of transport of the workpieces through the machine tool.

10. The machine tool as defined in claim 9, wherein the covers are movable synchronously.

11. The machine tool as defined in claim 1, wherein a transfer device for the transport of workpieces through the working area is provided.

12. The machine tool as defined in claim 11, wherein the at least one cover and the transfer device are controlled in a synchronized manner.

13. The machine tool as defined in claim 1, wherein the at least one cover is arranged so as to be exchangeable.

14. The machine tool as defined in claim 1, wherein a plurality of working areas is provided.

15. A transfer machine tool, comprising:
    at least one machine tool;
    a plurality of working areas in which workpieces are positionable and are machinable with at least one tool held by a tool holder;
    a discharge area for shavings;
    a housing forming a boundary of said discharge area; and
    at least one cover associated with a working area, said cover limiting the associated working area in the direction of the tool holder;

wherein said cover is movable and adapted for advancing towards a workpiece;

wherein the at least one cover has at least one opening associated with the tool for the passage of the tool;

said cover limiting the discharge area towards the working area; and said housing being arranged in a stationary manner so as to overlap with said cover in order to form a seal when the cover is advanced towards the workpiece.

16. The transfer machine tool as defined in claim 15, wherein a plurality of machining stations with respective working areas is provided.

17. The transfer machine tool as defined in claim 15, wherein the working areas follow one another in the direction of transport of workpieces.

18. The transfer machine tool as defined in claim 15, wherein the discharge of at least one of shavings and coolant is brought about individually at the working areas.

19. The machine tool as defined in claim 1, wherein the at least one cover is movable in a direction of movement which is essentially parallel to a direction of displacement of the tool holder.

* * * * *